(12) United States Patent
Jiang et al.

(10) Patent No.: US 11,971,726 B2
(45) Date of Patent: Apr. 30, 2024

(54) METHOD OF CONSTRUCTING INDOOR TWO-DIMENSIONAL SEMANTIC MAP WITH WALL CORNER AS CRITICAL FEATURE BASED ON ROBOT PLATFORM

(71) Applicant: Wuhan University of Science and Technology, Wuhan (CN)

(72) Inventors: Lin Jiang, Wuhan (CN); Dongjun Fang, Wuhan (CN); Wenkang Nie, Wuhan (CN); Chao Xiang, Wuhan (CN); Shengxi Jin, Wuhan (CN); Jianpeng Zuo, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 365 days.

(21) Appl. No.: 17/465,883

(22) Filed: Sep. 3, 2021

(65) Prior Publication Data
US 2022/0244740 A1     Aug. 4, 2022

(30) Foreign Application Priority Data
Feb. 2, 2021    (CN) .......................... 202110143146.1

(51) Int. Cl.
*G01S 17/89*      (2020.01)
*G01S 17/08*      (2006.01)
(Continued)

(52) U.S. Cl.
CPC ............ *G05D 1/0274* (2013.01); *G01S 17/08* (2013.01); *G01S 17/89* (2013.01); *G05D 1/0248* (2013.01);
(Continued)

(58) Field of Classification Search
CPC .............. G05D 1/0274; G05D 1/0248; G05D 2201/0211; G05D 1/0088; G05D 1/024; G05D 1/0251; G05D 1/0246; G01S 17/08; G01S 17/89; G01S 17/87; G01S 17/931; G06T 7/11; G06T 7/579; G06T 7/80; G06T 2207/10024; G06T 2207/10028; G06T 7/70; G06T 2207/20081;
(Continued)

(56) References Cited

U.S. PATENT DOCUMENTS 10,824,862 B2 * 11/2020 Qi ....................... G06F 18/2414
10,915,731 B2 * 2/2021 Mccormac ......... G06V 10/7715
(Continued)

*Primary Examiner* — Robert T Nguyen
(74) *Attorney, Agent, or Firm* — JCIP GLOBAL INC.

(57) ABSTRACT

A method of constructing an indoor wall corner two-dimensional semantic map based on a robot platform includes controlling, by the master control computer, the robot platform to move indoors, collecting, by the lidar sensor, a distance between an indoor object and the robot platform and a direction angle between the indoor object and the robot platform in real time and transmitting the distance and the direction angle to the master control computer, and obtaining, by the master control computer, an environment grid map and a real-time pose of the robot platform by processing the distance between the indoor object and the robot platform and the direction angle between the indoor object and the robot platform based on Gmapping algorithm; constructing a semantic segmentation data set as a training set on the master control computer and obtaining a predicted non-wall corner semantic label.

6 Claims, 5 Drawing Sheets

(51) Int. Cl.
*G05D 1/00* (2006.01)
*G06T 7/11* (2017.01)
*G06T 7/579* (2017.01)
*G06T 7/80* (2017.01)

(52) U.S. Cl.
CPC ............... *G06T 7/11* (2017.01); *G06T 7/579* (2017.01); *G06T 7/80* (2017.01); *G06T 2207/10024* (2013.01); *G06T 2207/10028* (2013.01)

(58) Field of Classification Search
CPC .......... G06T 2207/20084; G06V 10/82; G06V 10/267; G06V 20/10; G06V 2201/07; G01C 21/32; G06N 3/08; G06F 18/214
See application file for complete search history.

(56) References Cited

U.S. PATENT DOCUMENTS

| | | | |
|---|---|---|---|
| 11,501,478 B2* | 11/2022 | Brenner | G06T 7/70 |
| 11,734,861 B2* | 8/2023 | Goyal | G06T 3/0031 |
| | | | 345/634 |
| 11,890,544 B2* | 2/2024 | Zhai | A63F 13/60 |
| 2020/0074668 A1* | 3/2020 | Stenger | G06V 20/36 |
| 2020/0082198 A1* | 3/2020 | Yao | G06V 10/82 |
| 2021/0279950 A1* | 9/2021 | Phalak | G06T 7/55 |
| 2023/0363609 A1* | 11/2023 | Zhang | G05D 1/0214 |

* cited by examiner

Experimental scenario

RGB image

Semantic segmentation graph

Corner point detection graph

Original depth map     Visual depth map

Robot scenario     Robot view-angle     Color segmentation effect diagram (a) Original map     (b) Map after filtering     (c) Final map RGB image | Diagram of object detection and segmentation | Result map (a) RGB image | (b) Diagram of object detection and segmentation | (c) Result map Laser grid map Object semantic map Wall corner semantic map Semantic map of wall corner in environment Grid map containing semantics Optimizing semantic map

METHOD OF CONSTRUCTING INDOOR TWO-DIMENSIONAL SEMANTIC MAP WITH WALL CORNER AS CRITICAL FEATURE BASED ON ROBOT PLATFORM

CROSS-REFERENCE TO RELAYED APPLICATIONS

Pursuant to 35 U.S.C. § 119 and the Paris Convention Treaty, this application claims foreign priority to Chinese Patent Application No. 202110143146.1 filed Feb. 2, 2021, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of map construction, positioning and navigation of robot platforms, and more particularly to a method of constructing an indoor wall corner two-dimensional semantic map based on a robot platform.

Map construction is the first key step for an intelligent robot platform to complete positioning and navigation tasks. With the increasing requirements for intelligentization and automation of the robot platforms, the robot platforms are required to understand geometric and semantic information contained in a surrounding environment. However, a topological map or a grid map constructed by a traditional laser SLAM (simultaneous localization and mapping) method can only show topological information and geometric information in an environment without extraction and descriptions of semantic information of the environment, resulting in that the robot platform cannot truly understand the environment. Visual SLAM may be used to obtain environmental semantics which is capable of acquiring rich texture information. However, the visual SLAM is highly susceptible to light, has an unclear boundary and fewer textures in the dark, and is large in operation load, therefore an accumulated error may occur in map construction, which is not conducive to the construction of the two-dimensional semantic map. At the same time, movements of objects in an environment leads to large changes in a constructed semantic map. Therefore, it is very meaningful to add specific object semantics (e.g., wall corners) in some environments as inherent features of an environment map.

SUMMARY

The disclosure provides a method of constructing an indoor two-dimensional semantic map containing wall corner information to construct a grid map based on a laser SLAM algorithm, perform target identification and detection in combination with a visual sensor and a deep learning model at the same time to extract semantic information of objects such as wall corners in an environment, perform incremental estimation for whether an object is included in grids in combination with the Bayesian estimation method, perform information fusion for an obtained laser map and an obtained object semantic map, and perform representation for the obtained semantic map, so as to obtain a two-dimensional semantic grid map containing wall corners. Therefore, the map will provide richer features for positioning and navigation of the robot platform, so that the robot platform can complete more advanced and more complex tasks.

To solve the problems in the prior art, the disclosure provides a method of constructing an indoor wall corner two-dimensional semantic map based on a robot platform.

The robot platform comprises a robot chassis, a master control computer, a lidar sensor and a depth camera;
the robot chassis is provided with the master control computer, the lidar sensor and the depth camera;
the master control computer is sequentially connected to the robot chassis, the lidar sensor and the depth camera in a wired manner respectively;

The method of constructing an indoor wall corner two-dimensional semantic map comprises the following steps:

At step 1, a master control computer controls a robot chassis to drive the robot platform to move indoors. collecting, by the lidar sensor, a distance between an indoor object and the robot platform and a direction angle between the indoor object and the robot platform in real time and transmitting the distance and the direction angle to the main control computer, and obtaining, by the master control computer, an environment grid map and a real-time pose of the robot platform by processing the distance between the indoor object and the robot platform and the direction angle between the indoor object and the robot platform based on Gmapping algorithm;

at step 2, constructing a semantic segmentation data set as a training set on the master control computer and obtaining a predicted non-wall corner semantic label by inputting each non-wall corner sample image in the semantic segmentation data set into a DeepLab v2 network for prediction, and further constructing a DeepLab v2 network loss function in combination with the non-wall corner semantic label to obtain an optimized DeepLab v2 network through optimization training; and constructing a wall corner target detection data set as a training set and obtaining a predicted rectangular bounding box and an object type in the predicted rectangular bounding box by inputting each wall corner sample image in the wall corner target detection data set into an SSD Single Shot MultiBox Detector) network for prediction, and further constructing an SSD network loss function in combination with the prediction box and the object type in the wall corner marking box to obtain the optimized SSD network through optimization training;

at step 3, obtaining, by the master control computer, a view-angle color image of the robot platform by the depth camera, and inputting the view-angle color image into the optimized DeepLab v2 network for prediction to identify a semantic label of a non-wall corner in the view-angle color image; identifying the predicted rectangular bounding box of a wall corner and the object type in the predicted rectangular bounding box of the wall corner in the view-angle color image by passing the view-angle color image through the optimized SSD target detection network; and sequentially obtaining a three-dimensional point cloud coordinate of a non-wall corner and a three-dimensional point cloud coordinate of the wall corner by performing coordinate transformation for the semantic label of the non-wall corner in the view-angle color image, and the predicted rectangular bounding box of the wall corner and the object type in the predicted rectangular bounding box in the view-angle color image of the wall corner, and obtaining a filtered three-dimensional point cloud coordinate of the non-wall corner and a filtered three-dimensional point cloud coordinate of the wall corner by performing point cloud filtering for the three-dimensional point cloud coordinate of the non-wall corner and the three-dimensional point cloud coordinate of the wall corner respectively by using a filter based on a statistical method;

at step 4, obtaining, by the master control computer, a coordinate of a non-wall corner object in an environment grid map coordinate system and a coordinate of a wall corner object in the environment grid map coordinate system by performing point cloud coordinate transformation for the filtered three-dimensional point cloud coordinate of the non-wall corner and the filtered three-dimensional point cloud coordinate of the wall corner in combination with the real-time pose of the robot platform, and constructing an object grid map based on the coordinate of the non-wall corner object in the environment grid map coordinate system and the coordinate of the wall corner object in the environment grid map coordinate system; and at step 5, obtaining a complete environment grid map and a complete object grid map by repeatedly performing the steps 3-4 until the master control computer controls the robot platform to complete the traversal of the indoor environment, and further merging the complete environment grid map and the complete object grid map to obtain the indoor wall corner two-dimensional semantic map.

At step 1, the real-time pose of the robot platform is as follows:

$$c_{o,k}=(x_{o,k},y_{o,k},\theta_{o,k}), k \in [1,K]$$

where $c_{o,k}$ refers to the real-time pose of the robot platform at the k-th moment, $x_{o,k}$ refers to an x-axis coordinate of the robot platform in the environment grid map coordinate system at the k-th moment, $y_{o,k}$ refers to a y-axis coordinate of the robot platform in the environment grid map coordinate system at the k-th moment, $\theta_{o,k}$ refers to a yaw angle of the robot platform at the k-th moment, i.e., an included angle with an x-axis positive direction, and K refers to the number of collection moments.

At step 2, the semantic segmentation data set is as follows:

$$I=\{data_m(u,v), type_m(u,v)\}, m \in [1,M], u \in [1,U_I], v \in [1,V_I]$$

where, M refers to the number of non-wall corner sample images in the semantic segmentation data set I, $U_I$ refers to the number of columns of each non-wall corner sample image in the semantic segmentation data set I, $V_I$ refers to the number of rows of each non-wall corner sample image in the semantic segmentation data set I, $data_m(u,v)$ refers to a pixel in column u and row v of the m-th non-wall corner sample image in the semantic segmentation data set I, and $type_m(u,v)$ refers to a category of the pixel in column u and row v of the m-th non-wall corner sample image in the semantic segmentation data set I;

at step 2, the DeepLab v2 network loss function is a cross-entropy loss function;

at step 2, the optimized DeepLab v2 network is obtained through optimization training, comprising:

minimizing the cross-entropy loss function as an optimized target, and obtaining the optimized DeepLab v2 network through optimization based on the SGD (Stochastic Gradient Descent) algorithm;

at step 2, the target detection data set is as follows:

$$C=\{data_p(x,y), (x_{p,n}^{l,ul}, y_{p,n}^{l,ul}, x_{p,n}^{r,d}, y_{p,n}^{r,d}, Ty_{p,n,s})\},$$

$$p \in [1,P], x \in [1,X], y \in [1,Y], n \in [1,N_p]$$

where, P refers to the number of wall corner sample images in the target detection data set, X refers to the number of columns of each wall corner sample image in the target detection data set, Y refers to the number of rows of each wall corner sample image in the target detection data set, $N_P$ refers to the number of rectangular bounding boxes in the p-th wall corner sample image in the target detection data set, and s refers to a category of a pixel point; $data_p(x,y)$ refers to a pixel in column x and row y in the p-th wall corner sample image in the target detection data set, $x_{p,n}^{l,ul}$ refers to an abscissa of an upper left corner of the n-th rectangular bounding box in the p-th wall corner sample image in the target detection data set, $y_{p,n}^{l,ul}$ refers to an ordinate of the upper left corner of the n-th rectangular bounding box in the p-th wall corner sample image in the target detection data set, $x_{p,n}^{r,d}$ refers to an abscissa of a lower right corner of the n-th rectangular bounding box in the p-th wall corner sample image in the target detection data set, $y_{p,n}^{r,d}$ refers to an ordinate of the lower right corner of the n-th rectangular bounding box in the p-th wall corner sample image in the target detection data set, and $Ty_{p,n,s}$ refers to an object type in the n-th rectangular bounding box in the p-th wall corner sample image in the target detection data set;

at step 2, the SSD network loss function consists of a log loss function for classification and a smooth L1 loss function for regression;

at step 2, the optimized SSD network is obtained through optimization training, comprising:

obtaining the optimized SSD network through optimization based on the SGD algorithm.

At step 3, the semantic label of the non-wall corner in the view-angle color image is as follows:

$$*w_k=\{*data(u,v)_k, *type_{s,k}\}$$

where, $*data(u,v)_k$ refers to information of the pixel in column u and row v in the view-angle color image at the k-th moment, and $*type_{s,k}$ refers to an object category of the pixel in column u and row v in the view-angle color image at the k-th moment;

at step 3, the predicted rectangular bounding box of the wall corner and the object type in the predicted rectangular bounding box of the wall corner in the view-angle color image are as follows:

$$*e_k=\{data(x,y)_k, (x_n^l, y_n^l, x_n^h, y_n^h, Ty_s)_k\}$$

where, $*(x_n^l, y_n^l, x_n^h, y_n^h, Ty_s)_k$ refers to the position of the n-th predicted rectangular bounding box in column x and row y in the view-angle color image at the k-th moment and the wall corner category, and $data(x,y)_k$ refers to information of the a pixel in column x and row y in the view-angle color image at the k-th moment;

at step 3, coordinate transformation is performed for the semantic label of the non-wall corner in the view-angle color image, and the predicted rectangular bounding box of the wall corner and the object type in the predicted rectangular bounding box in the view-angle color image of the wall corner as follows:

obtaining a pixel coordinate set of non-wall corner semantics in a pixel coordinate system of the view-angle color image in combination with *$w_k$ and *$e_k$ as follows:

$$W_k=\{((i_w,j_w),\text{type}(i_w,j_w))_b\},b\in[1,B]$$

where, B refers to the total number of non-wall corner semantic pixel points in the current picture in the set; $(i_w,j_w)$ refers to a pixel point in row $i_w$ and column $j_w$ in the picture, and $((i_w,j_w),\text{type}(i_w,j_w))_b$ refers to that a pixel coordinate of the b-th semantic pixel point in the pixel coordinate set is $(i_w,j_w)$) and the pixel label is type$(i_w,j_w)$; and obtaining a pixel coordinate set of the wall corner semantics in the pixel coordinate system of the view-angle color image as follows:

$$E_k=\{((i_e,j_e),Ty(i_e,j_e))_t\},t\in[1,T]$$

where, T refers to the total number of wall corner semantic pixel points in the current picture in the set; $(i_e,j_e)$ refers to the pixel point in row $i_e$ and column $j_e$ in the picture, and $((i_e,j_e),Ty(i_e,j_e))_t$ refers to that a pixel coordinate of the t-th semantic pixel point in the pixel coordinate set is $(i_e,j_e)$ and the pixel label is $Ty(i_e,j_e)$;

for the coordinate $(i_w,j_w)_b$ of the non-wall corner semantics in the current color image pixel coordinate system obtained above, the depth information is obtained by using the acquired depth map, and the camera calibration parameters are transformed into a camera coordinate system, so as to obtain the three-dimensional point cloud coordinate of the non-wall corner as follows:

$$\begin{cases} Z_w = d_w/1000 \\ X_w = (i_w - c_x)\Box Z_w/f_x \\ Y_w = (j_w - c_y)\Box Z_w/f_y \end{cases}$$

where, $(X_w,Y_w,Z_w)$ refer to the three-dimensional point cloud coordinates of the non-wall corner, the coordinate $(i_w,j_w)$ of each corresponding pixel point in the non-wall corner semantic pixel coordinate set refer to that the pixel point is located in row $i_w$ and column $j_w$ in the current color picture, and $d_w$ refers to a depth value of the pixel coordinate $(i_w,j_w)$ in the depth image; $c_x$, $c_y$, $f_x$ and $f_y$ are camera calibration internal parameters, where $c_x$ and $c_y$ refer to transverse and vertical pixel numbers of a difference between a center pixel coordinate of the image and an origin pixel coordinate of the image respectively, i.e., an optical center, and $f_x$ $f_y$ refer to transverse and vertical distances from a focal point of a camera to the optical center of the camera respectively;

for the coordinate $(i_e,j_e)_t$ of the wall corner semantics in the current color image pixel coordinate system obtained above, the depth information is obtained by using the acquired depth map, and the camera calibration parameters are transformed into the camera coordinate system, so as to obtain the three-dimensional point cloud coordinate of the wall corner;

the point cloud coordinate $(X_e,Y_e,Z_e)$ of the wall corner semantics in the camera coordinate system is obtained as follows:

$$\begin{cases} Z_e = d_e/1000 \\ X_e = (i_e - x)\Box Z_e/f_x \\ Y_e = (j_e - c_y)\Box Z_e/f_y \end{cases}$$

where, $(X_e,Y_e,Z_e)$ refers to a three-dimensional point cloud coordinate of the wall corner obtained through transformation, the coordinate $(i_e,j_e)$ of each corresponding pixel point in the wall corner semantic pixel coordinate set refers to that the pixel point is located in the row $i_e$ and column $j_e$ in the current color picture, and $d_e$ refers to a depth value of the pixel coordinate $(i_e,j_e)$ in the depth image; $c_x$, $c_y$, $f_x$ and $f_y$ are camera calibration internal parameters, $c_x$ and $c_y$ refer to transverse and vertical pixel numbers of a difference between a center pixel coordinate of the image and an origin pixel coordinate of the image respectively, i.e., an optical center, and $f_x$ and $f_y$ refer to transverse and vertical distances from the focal point of the camera to the optical center of the camera respectively;

at step 3, point cloud filtering is performed for the three-dimensional point cloud coordinate $(X_w,Y_w,Z_w)$ of the non-wall corner and the three-dimensional point cloud coordinate $(X_e,Y_e,Z_e)$ of the wall corner respectively by using the filter based on the statistical method as follows:

after discrete point clouds are removed from point cloud data by using the filter based on the statistical analysis method, extracting a cluster of point clouds closest to the robot platform from the object point clouds which is equivalent to extracting outer contour point clouds of the object at a view angle, so as to obtain the filtered non-wall corner semantic point cloud coordinate $(X'_w,Y'_w,Z'_w)$ and the filtered wall corner semantic point cloud coordinate $(X'_e,Y'_e,Z'_e)$.

At step 4, the point cloud coordinate transformation is described as follows:

transforming the obtained the point cloud coordinate $(X'_w,Y'_w,Z'_w)$ of the non-wall corner semantics in the camera coordinate system into a robot platform coordinate system $(X_{robot,w},Y_{robot,w},Z_{robot,w})$ in the following relationship:

$$\begin{bmatrix} X_{robot,w} \\ Y_{robot,w} \\ Z_{robot,w} \\ 1 \end{bmatrix} = \begin{bmatrix} R_1 & T_1 \\ 0^T & 1 \end{bmatrix} \begin{bmatrix} X'_w \\ Y'_w \\ Z'_w \\ 1 \end{bmatrix}$$

transforming the obtained point cloud coordinate $(X'_e,Y'_e,Z'_e)$ of the wall corner semantics in the camera coordinate system into a robot platform coordinate system $(X_{robot,e},Y_{robot,e},Z_{robot,e})$ in the following relationship:

$$\begin{bmatrix} X_{robot,e} \\ Y_{robot,e} \\ Z_{robot,e} \\ 1 \end{bmatrix} = \begin{bmatrix} R_1 & T_1 \\ 0^T & 1 \end{bmatrix} \begin{bmatrix} X'_e \\ Y'_e \\ Z'_e \\ 1 \end{bmatrix}$$

in the above formula, $R_1$ and $T_1$ refer to a 3*3 rotation matrix and a 3*1 translation matrix between the Kinect v2 depth camera coordinate system and the mobile robot platform coordinate system respectively, which are determined based on a mounting position relationship of the depth camera on the robot platform, that is, $0^T=(0,0,0)$;

the non-wall corner semantic point cloud coordinate $(X_{robot,w},Y_{robot,w},Z_{robot,w})$ and the wall corner semantic point cloud coordinate $(X_{robot,e},Y_{robot,e},Z_{robot,e})$ in the robot platform coordinate system as well as the wall corner and non-wall corner semantic point cloud coordinate set $R=\{(X_{R,f},Y_{R,f},Z_{R,f})\}$ are all obtained through the above transformation, where a subscript f refers to the f-th semantic point in the set; for convenience of expression, the following semantic point cloud coordinates in the robot platform coordinate system are uniformly expressed by $(X_R, Y_R, Z_R)$;

then, the coordinate $(X_{Wo}, Y_{Wo}, Z_{Wo})$ in a world coordinate system is obtained by transforming the coordinate $(X_R, Y_R, Z_R)$ in the robot platform coordinate system in combination with the real-time pose $(X_{o,k}, y_{o,k}, \theta_{o,k})$ of the robot platform obtained based on the Gmapping map construction algorithm as follows:

a transformation relationship between the mobile robot platform coordinate system and the world coordinate system is:

$$\begin{bmatrix} X_{Wo} \\ Y_{Wo} \\ Z_{Wo} \\ 1 \end{bmatrix} = \begin{bmatrix} R_2 & T_2 \\ 0^T & 1 \end{bmatrix} \begin{bmatrix} X_R \\ Y_R \\ Z_R \\ 1 \end{bmatrix}$$

in the above formulas, $R_2$ and $T_2$ refer to a 3*3 rotation matrix and a 3*1 translation matrix between the mobile robot platform coordinate system and the real world coordinate system respectively, and $0^T$ is (0, 0, 0);

$$R_2 = \begin{bmatrix} \cos\theta_{o,k} & -\sin\theta_{o,k} & 0 \\ \sin\theta_{o,k} & \cos\theta_{o,k} & 0 \\ 0 & 0 & 1 \end{bmatrix}$$

$$T_2 = \begin{bmatrix} x_{o,k} \\ y_{o,k} \\ \theta_{o,k} \end{bmatrix}$$

finally, the coordinate $(X_g, Y_g)$ in the object grid map coordinate system is obtained by transforming the coordinate $(X_{Wo}, Y_{Wo})$ in the real world coordinate system:

$$\begin{cases} X_g = \text{ceil}\left(\dfrac{X_{Wo}}{r}\right) \\ Y_g = \text{ceil}\left(\dfrac{Y_{Wo}}{r}\right) \end{cases}$$

in the above formula, $(X_{Wo}, Y_{Wo})$ refer to a coordinate of a semantic point in the world coordinate system, $(X_g, Y_g)$ refer to a coordinate of the point in the object grid map coordinate system, r refers to a unit resolution of the object grid map, and cell refers to a symbol of rounding up;

the coordinate value $(X_g, Y_g)$ of each semantic point in the object grid map coordinate system is obtained through a series of coordinate transformations described above, and each finally-obtained semantic point is marked on the constructed object grid map; different object types $g_s$ are marked by different $color_s$.

At step 5, the complete environment grid map and the complete object grid map are merged as follows:

the center of the complete environment grid map is acquired and aligned with the center of the complete object grid map to traverse the coordinate of the non-wall corner object in the environment grid map coordinate system and the coordinate of the wall corner object in the environment grid map coordinate system and add the corresponding mark at this position to the corresponding position of the environment grid map, and the center of the complete environment grid map is consistent with the center and pose of the complete object grid map, so as to finally obtain the indoor wall corner two-dimensional semantic map.

The following advantages are associated with the method of constructing an indoor wall corner two-dimensional semantic map based on a robot platform of the disclosure.

In the disclosure, object semantic segmentation is performed by semantically segmenting a deep learning model to obtain accurate object semantics, so that an environment grid map originally constructed only with laser information has semantic meaning. At the same time, wall corners in the environment are identified in combination with an SSD target detection model, and the extracted wall corner semantics are added into the original semantic map. In this case, the wall corners have higher stability than other object semantics in the map. For the environment, their positions keep basically unchanged, thereby providing richer and more reliable features for positioning and navigation of the robot platform and enabling the robot platform to complete more advanced and more complex tasks.

DETAILED DESCRIPTION

To further illustrate, embodiments detailing a method of constructing an indoor wall corner two-dimensional semantic map based on a robot platform are described below. It should be noted that the following embodiments are intended to describe and not to limit the disclosure.

Figure 1:
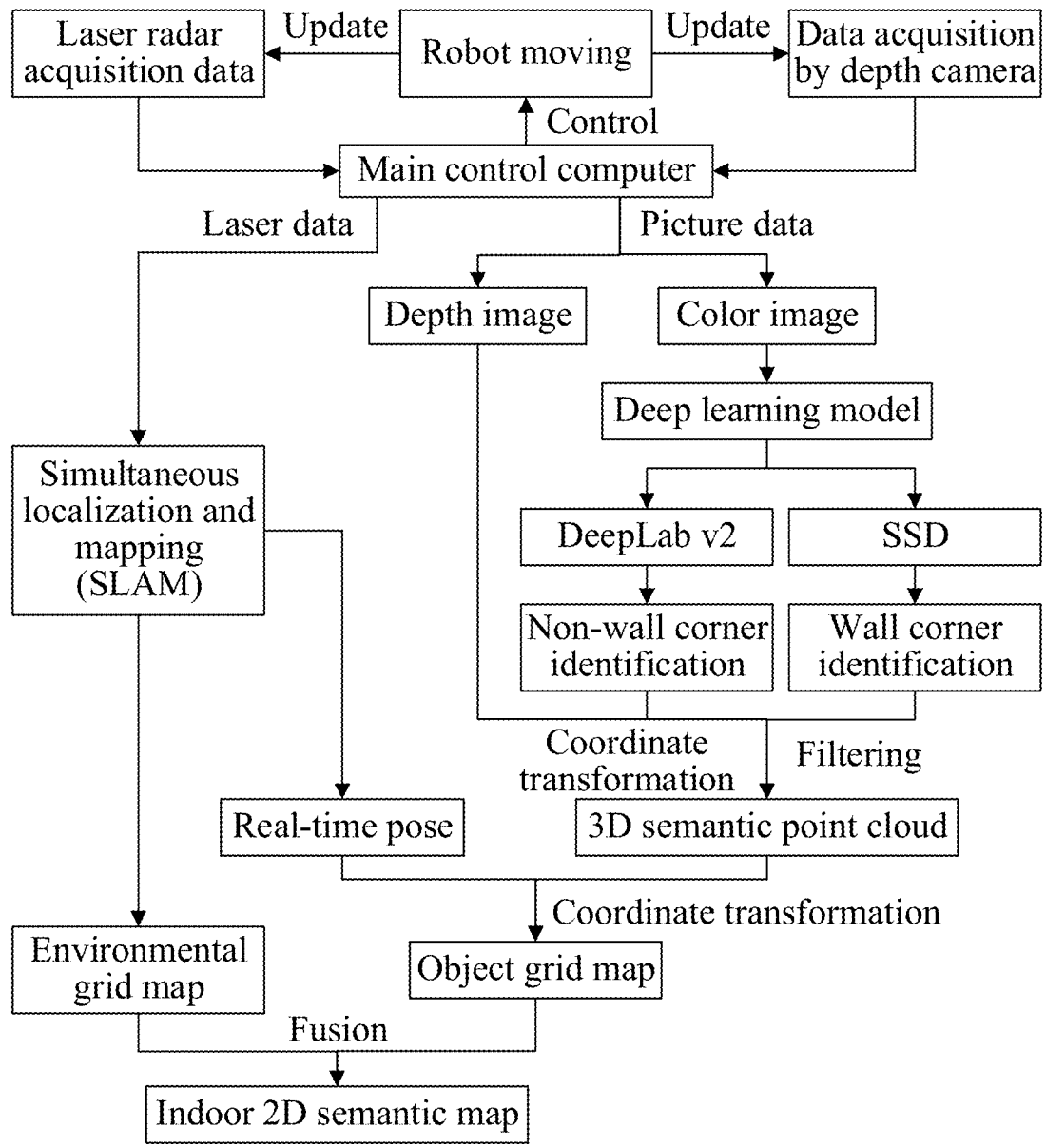
FIG. 1 is a flowchart of a method of constructing an indoor wall corner two-dimensional semantic map based on a robot platform according to the disclosure.

Specific embodiments of the disclosure will be introduced below in combination with FIGS. 1-10C. The first specific embodiment is a method of constructing an indoor wall corner two-dimensional semantic map based on a robot platform. FIG. 1 is a flowchart of the mentioned method.

The robot platform includes a robot chassis, a master control computer, a lidar sensor and a depth camera.

The robot chassis is provided with the master control computer, the lidar sensor and the depth camera.

The master control computer is sequentially connected to the robot chassis, the lidar sensor and the depth camera in a wired manner respectively.

The master control computer is a Core M417-D mini host.

The robot chassis is a Pibot-brand Arduino drive board chassis.

The lidar sensor is a SICK lms111 lidar with stable performance.

The depth camera is Kinect v2.

The method of constructing an indoor wall corner two-dimensional semantic map includes the following steps.

At step 1, preparatory work is carried out to train a network model for realizing target detection and segmentation tasks so as to realize semantic extraction during semantic map construction.

A semantic segmentation data set and a wall corner target detection data set are constructed as training sets and a predicted non-wall corner semantic label is obtained by inputting each non-wall corner sample image in the semantic segmentation data set into a DeepLab v2 network for prediction. A DeepLab v2 network loss function is further constructed in combination with the non-wall corner semantic label, to obtain an optimized DeepLab v2 network through optimization training. A predicted rectangular bounding box and an object type in the predicted rectangular bounding box are obtained by inputting each wall corner sample image in the wall corner target detection data set into an SSD network for prediction. An SSD network loss function is further constructed in combination with the predicted box and the object type in a wall corner marking box, to obtain the optimized SSD network through optimization training.

The semantic segmentation data set is as follows:

$$I=\{data_m(u,v),type_m(u,v)\}, m\in[1,M], u\in[1,U_I], v\in[1,V_I].$$

In the above formula, M refers to the number of non-wall corner sample images in the semantic segmentation data set I, $U_I$ refers to the number of columns of each non-wall corner sample image in the semantic segmentation data set I, $V_I$ refers to the number of rows of each non-wall corner sample image in the semantic segmentation data set I, $data_m(u,v)$ refers to a pixel in the u-th column and the v-th row of the m-th non-wall corner sample image in the semantic segmentation data set I, $type_m(u,v)$ refers to the category of the pixel in the u-th column and the v-th row of the m-th non-wall corner sample image in the semantic segmentation data set I.

The DeepLab v2 network loss function is a cross-entropy loss function.

The optimized DeepLab v2 network is obtained through optimization training, including:
minimizing the cross-entropy loss function as an optimized target, and
obtaining the optimized DeepLab v2 network through optimization based on the SGD algorithm.

The target detection data set is as follows:

$$C=\{data_p(x,y),(x_{p,n}^{l,u1},y_{p,n}^{l,u1},x_{p,n}^{r,d},y_{p,n}^{r,d},Ty_{p,n,s})\},$$

$$p\in[1,P], x\in[1,X], y\in[1,Y], n\in[1,N_p].$$

In the above formula, P refers to the number of wall corner sample images in the target detection data set, X refers to the number of columns of each wall corner sample image in the target detection data set, Y refers to the number of rows of each wall corner sample image in the target detection data set, $N_p$ refers to the number of rectangular bounding boxes in the p-th wall corner sample image in the target detection data set, and s refers to a category of a pixel point; $data_p(x,y)$ r refers to a pixel in the x-th column and the y-th row in the p-th wall corner sample image in the target detection data set, $x_{p,n}^{l,u1}$ refers to an abscissa of an upper left corner of the n-th rectangular bounding box in the p-th wall corner sample image in the target detection data set, $y_{p,n}^{l,u1}$ refers to an ordinate of the upper left corner of the n-th rectangular bounding box in the p-th wall corner sample image in the target detection data set, $x_{p,n}^{r,d}$ refers to an abscissa of a lower right corner of the n-th rectangular bounding box in the p-th wall corner sample image in the target detection data set, $y_{p,n}^{r,d}$ refers to an ordinate of the lower right corner of the n-th rectangular bounding box in the p-th wall corner sample image in the target detection data set, and $Ty_{p,n,s}$ refers to an object type in the n-th rectangular bounding box in the p-th wall corner sample image in the target detection data set.

The SSD network loss function consists of a log loss function for classification and a smooth L1 loss function for regression.

The optimized SSD network is obtained through optimization training, including:
obtaining the optimized SSD network through optimization based on the SGD algorithm.

The network model for realizing detection task is obtained by carrying out the above network training preparation work. Next, a semantic map will be constructed.

Figure 2:
FIG. 2 is a diagram of an experimental scenario.

At step 2, a semantic map construction experiment is carried out in the experimental scenario as shown in FIG. 2. Firstly, data collection is performed by manually controlling the robot platform to move in an indoor environment, and then, an environment grid map is constructed in combination with the Gmapping algorithm, and a real-time pose of a robot in the map is obtained.

The SICK lms111 lidar collects a distance r between a laser hit point and a radar transmission center and an orientation angle 0 in real time, the chassis collects odometer information, the Kinect v2 depth camera obtains a color image and a depth image in a target environment at the same moment, and transmits the obtained data to the master control computer in real time.

The constructed environment grid map and the real-time pose of the robot platform are updated in real time by transmitting the lidar data and the odometer data collected above into the Openslam Gmapping packet.

The above Gmapping algorithm is mainly used to realize synchronous positioning and map construction functions by particle filtering. The constructed map is maintained and updated based on steps such as pose prediction of kinematic model, scanning and matching, weight updating and re-sampling, and a moving trajectory of the robot, i.e. a real-time pose of the robot, may be obtained at the same time.

The real-time pose of the robot platform obtained above is as follows:

$$c_{o,k}=(x_{o,k},y_{o,k},\theta_{o,k}), k\in[1,K]$$

In the above formula, $c_{o,k}$ refers to the real-time pose of the robot platform at the k-th moment, $x_{o,k}$ refers to the x-axis coordinate of the robot platform in the environment grid map coordinate system at the k-th moment, $y_{o,k}$ refers to the y-axis coordinate of the robot platform in the environment grid map coordinate system at the k-th moment, $\theta_{o,k}$ refers to a yaw angle of the robot platform at the k-th moment, i.e., an included angle with the positive direction of the x-axis, and K refers to the number of collection moments.

Figure 3A:
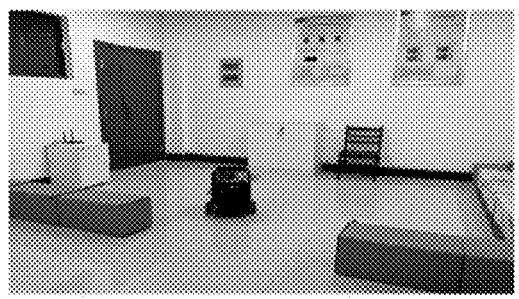
FIGS. 3A-3D are schematic diagrams of object detection and segmentation of a robot platform.
Figure 3B:
Figure 3C:
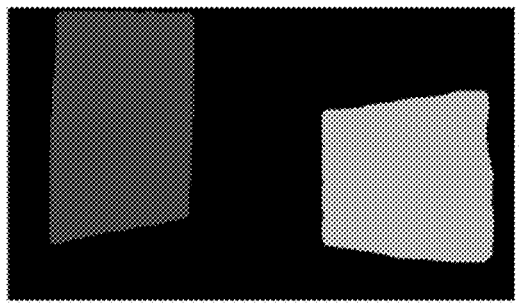
Figure 3D:
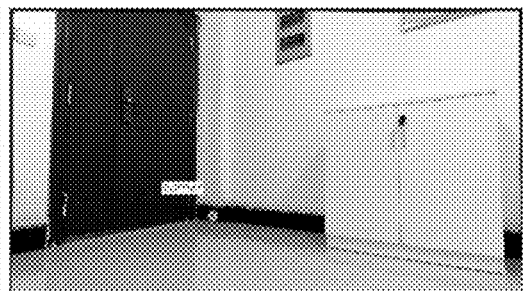

At step 3, target semantics such as wall corners during map construction are extracted in combination with the images collected by the camera and a trained neural network model. For example, based on the view angles corresponding to FIG. 3A and FIG. 3B, an identification detection result of a non-wall corner object is as shown in FIG. 3C, and an identification detection result of a wall corner is as shown in FIG. 3D.

Firstly, during a map construction, the master control computer obtains an image transmitted by the Kinect V2 depth camera in real time, inputs a view-angle color image into the optimized DeepLab v2 network for prediction, and identifies semantic labels of non-wall corners in the view-angle color image; and identifies the predicted rectangular bounding box of wall corners and the object type in the predicted rectangular bounding box of wall corners in the view-angle color image by passing the view-angle color image through the optimized SSD target detection network.

The semantic label of the non-wall corner in the view-angle color image is as follows:

$$*w_k = \{*data(u,v)_k, *type_{s,k}\}.$$

In the above formula, $*data(u\ v)_k$ refers to information of a pixel in the u-th column and the v-th row in the view-angle color image at the k-th moment, and $*type_{s,k}$ refers to an object category of the pixel in the u-th column and the v-th row in the view-angle color image at the k-th moment.

The predicted rectangular bounding box of wall corner and the object type in the predicted rectangular bounding box of wall corner in the view-angle color image are as follows:

$$*e_k = \{data(x,y)_k, (x_n^l, y_n^l, x_n^h, y_n^k, Ty_s)_k\}.$$

In the above formula, $*(x_n^1, y_n^1, x_n^h, Ty_s)_k$ refers to a position of the n-th predicted rectangular bounding box in in column x and row ]y in the view-angle color image at the k-th moment and its wall corner category, and $data(x,y)_k$ refers to information of the a pixel in column x and row y in the view-angle color image at the k-th moment.

Figures 4A, 4B:
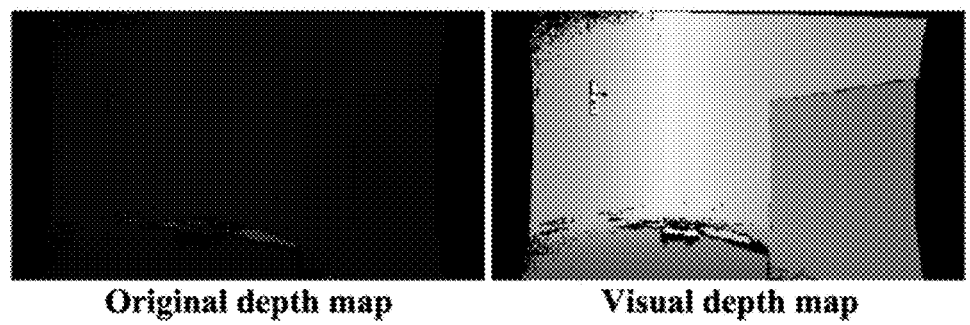
FIGS. 4A-4B are depth maps and its visual diagram.

Next, three-dimensional point cloud coordinate of non-wall corner and three-dimensional point cloud coordinate of wall corner are sequentially obtained by performing coordinate transformation for the semantic labels of non-wall corners in the view-angle color image as shown in FIGS. 3A-3D, the predicted rectangular bounding box of wall corners and the object type in the predicted rectangular bounding box in the view-angle color image in combination with the depth information included in a depth map as shown in FIGS. 4A-4B and obtained by the Kinect V2 camera; point cloud filtering is performed for the three-dimensional point cloud coordinate of non-wall corner and the three-dimensional point cloud coordinate of wall corner respectively by using a filter based on a statistical method to obtain the filtered three-dimensional point cloud coordinate of non-wall corner and the filtered three-dimensional point cloud coordinate of wall corner.

The coordinate transformation is performed below.

A pixel coordinate set of non-wall corner semantics in a pixel coordinate system of the view-angle color image is obtained in combination with $*w_k$ and $*e_k$ as follows:

$$W_k = \{((i_w, j_w), type(i_w, b, j_w))_b\}, b \in [1, B].$$

In the above formula, B refers to the total number of non-wall corner semantic pixel points in the current picture in the set; $(i_w, j_w)$ refers to the pixel point of the $i_w$-th row and $j_w$-th column in the picture, and $((i_w, j_w), type(i_w, j_w))_b$ refers to that pixel coordinate of the b-th semantic pixel point in the pixel coordinate set in the picture is $(i_w, j_w)$ and the pixel label is $type(i_w, j_w)$.

A pixel coordinate set of wall corner semantics in the pixel coordinate system of the view-angle color image is obtained as follows:

$$E_k = \{((i_e, j_e), Ty(i_e, j_e))_t\}, t \in [1, T].$$

In the above formula, T refers to the total number of wall corner semantic pixel points in the current picture in the set; $(i_e, j_e)$ refers to the pixel point of the $i_e$-th row $j_e$-th column in the picture, and $((i_e, j_e), Ty(i_e, j_e))_t$ refers to that pixel coordinate of the t-th semantic pixel point in the pixel coordinate set in the picture is $(i_e, j_e)$ and the pixel label is $Ty(i_e, j_e)$.

The depth information of the coordinate $(i_w, j_w)_b$ of the non-wall corner semantics in the current color image pixel coordinate system obtained above is obtained by using the acquired depth map, and the camera calibration parameters are transformed into a camera coordinate system, so as to obtain the three-dimensional point cloud coordinate of non-wall corner as follows:

$$\begin{cases} Z_w = d_w / 1000 \\ X_w = (i_w - c_x) \cdot Z_w / f_x \\ Y_w = (j_w - c_y) \cdot Z_w / f_y \end{cases}.$$

In the above formula, $(X_w, Y_w, Z_w)$ refer to three-dimensional point cloud coordinate of non-wall corner, coordinate $(i_w, j_w)$ of each corresponding pixel point in the non-wall corner semantic pixel coordinate set refers to that the pixel point is located in the $i_w$-th row and the $j_w$-th column in the current color picture, and $d_w$ refers to a depth value of the pixel coordinate $(i_w, j_w)$ in the depth image; $c_x$, $c_y$, $f_x$ and $f_y$ are camera calibration internal parameters, $c_x$ and $c_y$ refer to transverse and vertical pixel numbers of a difference between a center pixel coordinate of the image and an origin pixel coordinate of the image respectively, i.e. an optical center, and $f_x$ and $f_y$ refer to transverse and vertical distances from a focal point of the camera to the optical center of the camera respectively.

The depth information of the coordinate $(i_e, j_e)_t$ of the wall corner semantics in the current color image pixel coordinate system obtained above is obtained by using the acquired depth map, and the camera calibration parameters are transformed into the camera coordinate system, so as to obtain the three-dimensional point cloud coordinate of wall corner.

The point cloud coordinate $(X_e, Y_e, Z_e)$ of the wall corner semantics in the camera coordinate system is obtained as follows:

$$\begin{cases} Z_e = d_e / 1000 \\ X_e = (i_e - c_x) \cdot Z_e / f_x \\ Y_e = (j_e - c_y) \cdot Z_e / f_y \end{cases}.$$

In the above formula, $(X_e, Y_e, Z_e)$ refer to three-dimensional point cloud coordinate of wall corner obtained through transformation, coordinate $(i_e, j_e)$ of each corresponding pixel point in the wall corner semantic pixel coordinate set refers to that the pixel point is located in the $i_e$-th row and the $j_e$-th column in the current color picture, and $d_e$ refers to a depth value of the pixel coordinate $(i_e, j_e)$ in the depth image; $c_x$, $c_y$, $f_x$ and $f_y$ are camera calibration internal parameters, $c_x$ and $c_y$ refer to transverse and vertical pixel numbers of a difference between a center pixel coordinate of the image and an origin pixel coordinate of the image respectively, i.e., an optical center, and $f_x$ and $f_y$ refer to transverse and vertical distances from the focal point of the camera to the optical center of the camera respectively.

Figures 5A, 5B, 5C:
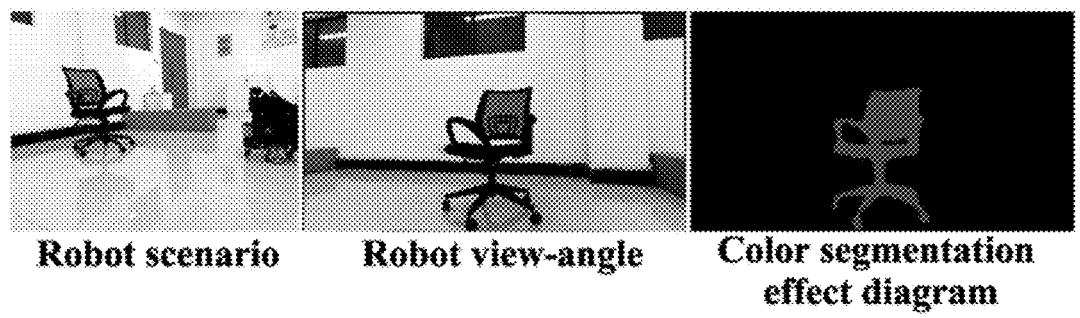
FIGS. 5A-5C are diagrams of preliminary semantic extraction of a chair.
Figure 6:
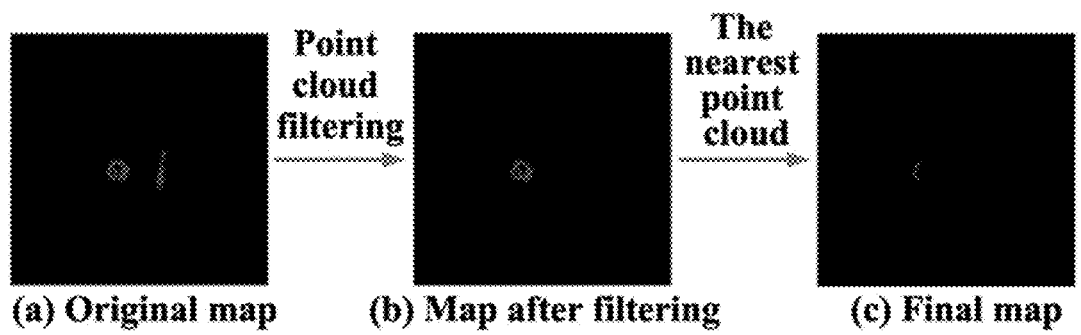
FIG. 6 shows two-dimensional mapping of hollow chair point clouds.

Then, point cloud filtering is performed for the three-dimensional point cloud coordinate $(X_w, Y_w, Z_w)$ of non-wall corner and the three-dimensional point cloud coordinate $(X_e, Y_e, Z_e)$ of wall corner respectively by using the filter based on the statistical method. For example, a color segmentation diagram (c) is obtained after segmenting a chair in an environment as shown in FIG. 5A by using a training model. Due to a hollow structure of the chair, part of point clouds in the segmentation diagram actually are point clouds on a wall behind the chair; these 3D point clouds are mapped onto a two-dimensional plane without any processing, with the effect including "false semantics" as shown in (a) of FIG. 6.

In consideration of a measuring range of the Kinect v2 depth camera, there will be a large error in a too close or too far measurement result. It is assumed that only the point clouds within a set range of 0.5-4.5 m are processed, and the point clouds greater or smaller than the set range are removed. To facilitate filtering, dimensional reduction operation is performed for the remaining point clouds. That is, the point clouds are firstly transformed into two-dimensional point clouds (ZX plane), and then, noise points (outliers) are removed from point cloud data by using a filter based on a statistical analysis method to obtain a two-dimensional mapping effect diagram of the chair point clouds as shown in (b) of FIG. 6. To represent the semantic information of the extracted object better, a cluster of point clouds closest to the robot are extracted from the object point clouds, which is equivalent to extracting outer contour point clouds of the object at a view angle, with an extraction effect as shown in (c) of FIG. 6.

After the discrete point clouds are removed from the point cloud data by using the filter based on the statistical analysis method, a cluster of point clouds closest to the robot platform are extracted from the object point clouds to extract the outer contour point clouds of the object at the view angle, so as to obtain the filtered non-wall corner semantic point cloud coordinate $(X'_w, Y'_w, Z'_w)$ and the filtered wall corner semantic point cloud coordinate $(X'_e, Y'_e, Z'_e)$.

At step 4, an object semantic map containing wall corners is constructed by mapping the acquired target semantic point clouds onto the object map in combination with the real-time pose $(x_{o,k}, y_{o,k}, \theta_{o,k})$ of the robot and the incremental method.

The master control computer obtains the coordinate of the non-wall corner object in the environmental grid map coordinate system and the coordinate of the wall corner object in the environmental grid map coordinate system by performing point cloud coordinate transformation for the filtered three-dimensional point cloud coordinate of non-wall corner and the filtered three-dimensional point cloud coordinate of wall corner respectively in combination with the real-time pose of the robot platform, so as to construct an object grid map based on the coordinate of each semantic point in the environment grid map coordinate system.

In the incremental map construction method, the states of the object semantic map before and after grid update are denoted by $Q_{t-1}$ and $Q_t$ respectively, and an update item of a model measurement value is denoted by $\Delta q$. The following formula is obtained.

$$Q_t = \Delta q + Q_{t-1}$$

Figures 7A, 7B, 7C:
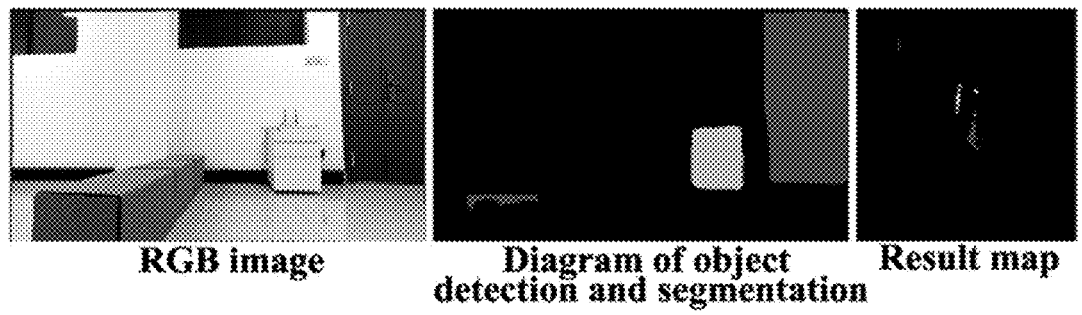
FIGS. 7A-7C are diagrams of semantic mapping during misdetection.
Figure 8:
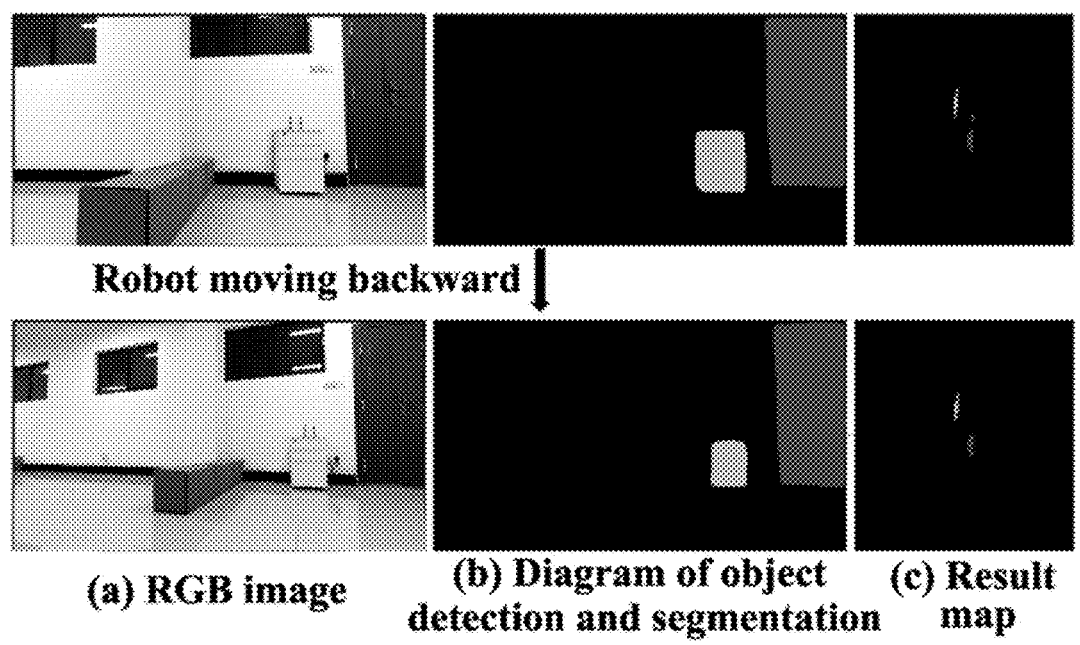
FIG. 8 shows effect diagrams of eliminating "false semantics" by an incremental method.

For an initial blank map, each grid corresponds to an initial state value $Q_0 = 0$, different state update increments $\Delta q$ are set based on detection accuracy values of different types of objects, and a grid threshold $D_q$ is also set. It is proved that an object is present in the grid only when the grid state value is greater than $D_q$, and thus, the constructed map will be updated to show that the grid is in an occupied state. When the object semantic grid map is constructed by the above incremental estimation method, the "false semantics" resulted from misdetection may be eliminated. For example, as shown in FIGS. 7A-7C, when the robot identifies an object around it, a wooden block is mistakenly segmented into a chair in a frame; if semantic mapping is directly performed for the identified object, there will be incorrect semantic information in the obtained result, as shown in FIG. 7C. Multiple detections are performed for the mistakenly-identified position by controlling the robot to move to different positions, so as to eliminate a probability value of the grid at the mistakenly-identified position and obtain the accurate object semantics. An effect diagram obtained in the process is as shown in FIG. 8, in which the "false semantics" are gradually eliminated.

The point cloud coordinate transformation described at step 4 is described below.)

The obtained point cloud coordinate $(X'_w, Y'_w, Z'_w)$ of the non-wall corner semantic point clouds in the camera coordinate system is transformed into a robot platform coordinate system based $(X_{robot,w}, Y_{robot,w}, Z_{robot,w})$ on the following relationship.

$$\begin{bmatrix} X_{robot,w} \\ Y_{robot,w} \\ Z_{robot,w} \\ 1 \end{bmatrix} = \begin{bmatrix} R_1 & T_1 \\ 0^T & 1 \end{bmatrix} \begin{bmatrix} X'_w \\ Y'_w \\ Z'_w \\ 1 \end{bmatrix}$$

The obtained point cloud coordinate $(X'_e, Y'_e, Z'_e)$ of the wall corner semantic point clouds in the camera coordinate system is transformed into a robot platform coordinate system $(X_{robot,e}, Y_{robot,e}, Z_{robot,e})$ based on the following relationship.

$$\begin{bmatrix} X_{robot,e} \\ Y_{robot,e} \\ Z_{robot,e} \\ 1 \end{bmatrix} = \begin{bmatrix} R_1 & T_1 \\ 0^T & 1 \end{bmatrix} \begin{bmatrix} X'_e \\ Y'_e \\ Z'_e \\ 1 \end{bmatrix}$$

In the above formula, $R_1$ and $T_1$ refer to a 3*3 rotation matrix and a 3*1 translation matrix between the Kinect v2 depth camera coordinate system and the mobile robot platform coordinate system respectively, which are determined based on a mounting position of the depth camera on the robot platform, where, $0^T = (0, 0, 0)$ The non-wall corner semantic point cloud coordinate $(X_{robot,w}, Y_{robot,w}, Z_{robot,w})$ in the robot platform coordinate system and the wall corner semantic point cloud coordinate $(X_{robot,e}, Y_{robot,e}, Z_{robot,e})$ in the robot platform coordinate system as well as a wall corner and non-wall corner semantic point cloud coordinate set $R = \{(X_{R,f}, Y_{R,f}, Z_{R,f})\}$ are obtained through the above transformation. A subscript f refers to the f-th semantic point in the set; for convenience of representation, the following semantic point cloud coordinate in the robot platform coordinate system is expressed by $(X_R, Y_R, Z_R)$ in a unified way.

Then, in combination with the Gmapping map construction algorithm, the real-time pose of the robot platform is obtained, and the coordinate $(X_R, Y_R, Z_R)$ in the robot platform coordinate system is transformed into $(X_{Wo}, Y_{Wo}, Z_{Wo})$ in a world coordinate system, which is detailed below.

A transformation relationship between the mobile robot platform coordinate system and the world coordinate system is as follows:

$$\begin{bmatrix} X_{Wo} \\ Y_{Wo} \\ Z_{Wo} \\ 1 \end{bmatrix} = \begin{bmatrix} R_2 & T_2 \\ 0^T & 1 \end{bmatrix} \begin{bmatrix} X_R \\ Y_R \\ Z_R \\ 1 \end{bmatrix}.$$

In the above formula, $R_2$ and $T_2$ refer to a 3*3 rotation matrix and a 3*1 translation matrix between the mobile robot platform coordinate system and the real world coordinate system respectively, and $0^T$ is (0, 0, 0).

$$R_2 = \begin{bmatrix} \cos\theta_{o,k} & -\sin\theta_{o,k} & 0 \\ \sin\theta_{o,k} & \cos\theta_{o,k} & 0 \\ 0 & 0 & 1 \end{bmatrix}$$

$$T_2 = \begin{bmatrix} x_{o,k} \\ y_{o,k} \\ \theta_{o,k} \end{bmatrix}$$

Finally, the coordinate $(X_g, Y_g)$ in the object grid map coordinate system is obtained by transforming the coordinate $(X_{Wo}, Y_{Wo})$ in the real world coordinate system.

$$\begin{cases} X_g = \text{ceil}\left(\frac{X_{Wo}}{r}\right) \\ Y_g = \text{ceil}\left(\frac{Y_{Wo}}{r}\right) \end{cases}$$

In the above formula, $(X_{Wo}, Y_{Wo})$ refer to a coordinate value of a semantic point in the world coordinate system, $(X_g, Y_g)$ refer to a coordinate value of the point in the object grid map coordinate system, r refers to a unit resolution of the object grid map, and ceil refers to a symbol of rounding up.

The coordinate value $(X_g, Y_g)$ of each semantic point in the object grid map coordinate system is obtained through a series of coordinate transformations described above, and each obtained semantic point is marked on the constructed object grid map;

different object types $g_s$ are marked by different color$_s$.

Through the above steps 1 to 4, the environmental grid map and the object semantic map containing wall corners may be constructed in real time at the same time.

Figure 9A:
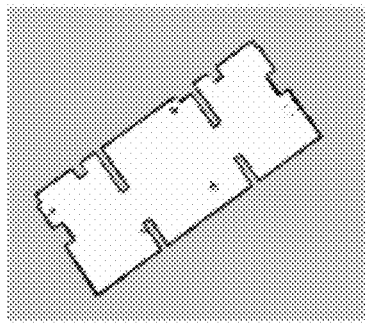
FIGS. 9A-9C are maps of semantic mapping.
Figure 9B:
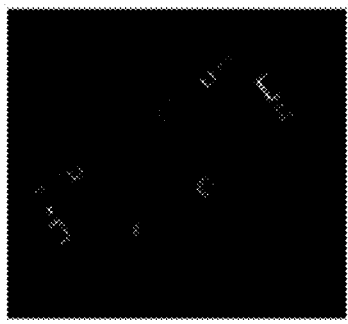
Figure 9C:
Figure 10A:
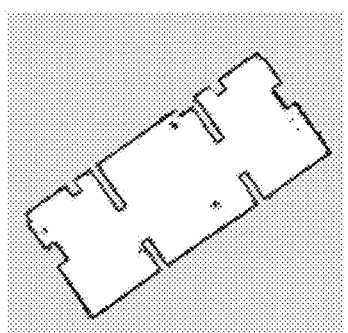
FIGS. 10A-10C are semantic grid maps obtained through synthesis.

At step 5, the robot is manually controlled to move in the entire scenario to repeat steps 2 to 4. At step 2, the environment grid map is constructed by using a SICK lidar and the real-time pose of the robot in the constructed map is output. At steps 3 and 4, the object semantic grid map containing wall corners is constructed by performing extraction and coordinate transformation for the target semantics such as wall corners in the environment by using the visual images collected with the Kinect V2 depth camera and the deep learning model. After the environment as shown in FIG. 1 is traversed, a complete environment grid map as shown in FIG. 9A, a complete non-wall corner object semantic map as shown in FIG. 9B and a complete wall corner semantic map as shown in FIG. 9C are obtained and merged to obtain a final indoor two-dimensional semantic map with wall corner information as shown in FIGS. 10A-10C.

The maps are merged in the following process.

The center of the complete environment grid map is acquired and aligned with the center of the complete object grid map to traverse the coordinates of the non-wall corner objects in the environment grid map coordinate system and the coordinates of the wall corner objects in the environment grid map coordinate system and add the corresponding mark at this position into the corresponding position of the environment grid map, and the center of the complete environment grid map needs to be consistent with the center and pose of the complete object grid map. To express high-level semantic information included in the constructed semantic map more clearly, some optimizations are performed for the map, that is, different shapes of color blocks are used to replace different types of objects in the map to visually represent the actual sizes of the objects, with a result as shown in FIG. 10C.

Figure 10B:
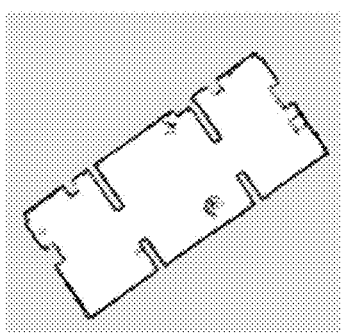
Figure 10C:
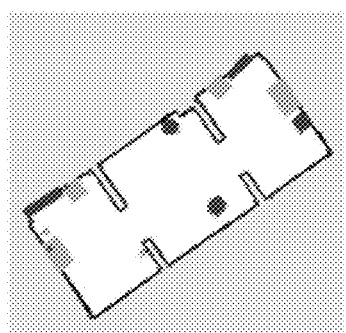

Specifically, for the object semantic map as shown in FIG. 10B, the marks of different colors represent different types of objects. Firstly, image morphology operation is performed for the map to remove, by corrosion, a discrete projection point mapped by each object in the map and then expansion operation is performed to connect breakpoints, so as to obtain a more complete object projection. Graying or binarization processing is performed for the map, a contour of each continuous marking line in the drawing is searched out with an image library function, and then, the minimum bounding rectangle or circle of each obtained contour is depicted, where the center of the rectangle or circle is taken as a projection center of the object. Object mappings of cabinets and doors are replaced by using the minimum bounding rectangle, and semantic projections of trash bins and chairs are replaced by using the minimum bounding circle, as shown in FIG. 10C. Therefore, the indoor two-dimensional semantic map with wall corner information is obtained.

A second embodiment of the disclosure will be introduced below.

At step 1, in a real experimental scenario, instant positioning of the robot platform and construction of a grid map are completed on an ROS operation platform based on the Gmapping algorithm by means of an LMS111 lidar sensor and a mobile robot platform experimental platform. A diagram of the experimental scenario is as shown in FIG. 2.

The robot platform moves in an environment to continuously perfect the map. According to odometer data and an odometer kinematic model obtained by the robot platform, a pose of the robot platform at the current moment is estimated. Each particle includes the poses of the robot platform from the beginning of map construction of the robot platform to all current moments and the current environment map. Then, scanning and matching are performed by using a laser likelihood domain model based on laser data to calculate a matching degree of the map included in the particle and the constructed map, perform weight updating and re-sampling, and update the map of the particle. The pose of the particle with the highest score is the optimal pose. The position of the robot platform is acquired in real time, and the environment grid map is gradually generated.

At step 2, a robot platform view-angle image is obtained with a depth camera and a color image is input into a deep learning detection model to identify a target object and a wall corner in a field of view.

Firstly, an indoor semantic segmentation data set and an indoor object detection data set are prepared based on a moderate and widespread data scenario and the balance principle of data category and data quantity in this specification. Indoor scenario pictures are collected under multiple view angles, multiple distances and multiple brightness, and pictures of an actual use scenario of the robot platform are added to form a data set INDOOR1 of an indoor semantic segmentation task and a data set INDOOR2 of a detection and identification task in this specification. To further enrich the data sets and improve a model generalization capability simultaneously, data enhancement operations such as color change, scale transformation and random cropping are performed for the data sets before training. The DeepLab v2 network and the SSD network are constructed, and a weight of the SSD network model is initialized by using a network weight pre-trained on an ImageNet data set to perform model training by using the prepared data set in a GPU mode.

When the robot platform moves to construct the map in the environment, a view-angle color image obtained by the mounted depth camera is taken as an input of the trained detection model to obtain an object detection and identification result at the current view angle. For example, when the robot platform is in the scenario shown in FIG. 3A, the detection result of the wall corner is as shown in FIG. 3D, in which a solid circle represents a position of the detected wall corner in the picture. The detection and segmentation effect of door and chair at the view angle is as shown in FIG. 3C, in which non-black parts represent the detected door and cabinet respectively. It can be seen that the obtained detection result is good, and may be taken as an input for the next semantic point cloud extraction.

At step 3, three-dimensional point cloud coordinate of the identified wall corner in a camera coordinate system is obtained in combination with a corresponding depth map at the same view angle, and false semantic point cloud in the generated point cloud data are removed by performing the corresponding filtering.

After an object in an RGB image is detected, category and position information of the object in a two-dimensional image may be obtained, and actual distance information is obtained in combination with depth map information to achieve transformation of three-dimensional information. The depth map corresponding to the scenario shown in the above drawing is as shown in FIGS. 4A-4B.

After a corresponding relationship between a color map and the depth is obtained, the coordinate $(X_K, Y_K, Z_K)$ of the point cloud in the Kinect v2 camera coordinate system is obtained based on the formula (1).

$$\begin{cases} Z_k = d/1000 \\ X_k = (u - c_x) \Box Z_k/f_x \\ Y_k = (v - c_y) \Box Z_k/f_y \end{cases} \quad (1)$$

In the above formula, u and v refer to a pixel coordinate value of the segmented object in the RGB image, d refers to a depth value of the pixel coordinate (u,v) in the depth image, and $c_x$, $c_y$, $f_x$ and $f_y$ refer to camera calibration internal parameters, and are a focal distance and an aperture center of the camera on two axes respectively.

The 3D point cloud coordinate of the identified object in the camera coordinate system may be obtained through the above coordinate transformation.

The initial 3D semantic point clouds are partially filtered out in consideration of misdetection of a training model and a computing amount of generation of point semantics. The color segmentation diagram FIG. 5C is obtained after segmenting the chair in the environment as shown in FIG. 5A by using the training model. Due to the hollow structure of the chair, some of point clouds in the segmentation diagram actually are point clouds on the wall behind the chair. If next operation is directly performed for all these point clouds, there will be many false semantics in the obtained semantic information. These 3D point clouds may be directly mapped onto the two-dimensional plane without any processing with effect as shown in (a) of FIG. 6. It can be seen from the mapping diagram that there are some point clouds that obviously do not belong to the chair, and the obtained object projection is very messy. Therefore, it is very necessary to perform corresponding filtering for the generated point cloud data.

In consideration of the measuring range of the Kinect v2 depth camera, there will be a large error in the too close or too far measurement result. It is assumed that only the point clouds within a set range of 0.5-5 m are processed, and the point clouds greater or smaller than the set range are removed. To facilitate filtering, dimension reduction operation is performed for the remaining point clouds, that is, the point clouds are firstly transformed into two-dimensional point clouds, and then, noise points (outliers) are removed from the point cloud data by using a filter based on a statistical analysis method. The filter works in the following principle: the filter calculates an average distance from each point in an input point cloud set to all adjacent points to obtain a result in conformity with Gaussian distribution, calculates a mean value and a variance, and removes those two-dimensional points away from the mean value. After the above point cloud removal operation is performed for the chair point cloud information in the above drawing, the obtained two-dimensional mapping effect diagram of the chair point clouds is as shown in (b) of FIG. 6.

It can be seen that the generated chair semantic information is more accurate. To represent the extracted semantic information of the object better, a cluster of point clouds closest to the robot platform are extracted from the object point clouds, which is equivalent to extracting outer contour point clouds of the object at a view angle. Specifically, after the object semantic mapping diagram is obtained, grid points closest to the robot platform in each column in the image are extracted, and the corresponding point clouds are retained to receive the next coordinate system transformation operation, with an extraction effect as shown in (c) of FIG. 6.

After filtering is performed for the object point cloud coordinate in the camera coordinate system, the mapping coordinate of the outer contour semantic point clouds the object in the camera plane is obtained.

At step 4, the semantic coordinate in a robot platform coordinate system is transformed into a world coordinate system by using the real-time pose of the robot platform obtained based on the Gmapping mapping algorithm, and then mapped into a two-dimensional grid coordinate system by an incremental estimation method, and represented on the constructed object grid map.

An object semantic grid map and a laser grid map are constructed at the same time. Firstly, a square blank grid map is constructed with the center of the map as a starting point for constructing the map, such that the environment is divided into a plurality of grid units with the same size, where its map resolution value is set to be consistent with a map construction resolution value based on Gmapping algorithm except for a difference in that the constructed object semantic grid map only includes the extracted object semantic mapping information, and the remaining grids without identified object projections are considered to be in an idle state. In consideration of the existing error, the mapping coordinates of the same part of the same object detected at different moments and different positions on the map will be inconsistent, and the determination will be performed in combination with historical states of grid points.

To minimize such errors, the grid state is updated by incremental estimation based on the Bayesian method.

For the grid map, Q(s) represents the grid state determined by an occupation probability p(s=1) and an idle probability p(s=0) of the grid.

$$Q(s) = \frac{p(s=1)}{p(s=0)} \quad (2)$$

When sensor data is received, a new model measurement value z is obtained. There are only two states (0 or 1) for the measurement value. The grid state Q(s|z) is updated based on the formula (2).

$$Q(s|z) = \frac{p(s=1|z)}{p(s=0|z)} \quad (3)$$

The occupation probability and the idle probability of the grid when the measurement value is z may be obtained based on the above formula (3).

$$\begin{cases} p(s=1|z) = \frac{p(z|s=1)p(s=1)}{p(z)} \\ p(s=0|z) = \frac{p(z|s=0)p(s=0)}{p(z)} \end{cases} \quad (4)$$

Q(s|z) may be obtained based on the formulas (3) and (4).

$$Q(s|z) = \frac{p(s=1|z)}{p(s=0|z)} \quad (5)$$
$$= \frac{p(z|s=1)}{p(z|s=0)} * Q(s)$$

The following may be obtained by removing logarithm at left and right sides of the formula (5) at the same time.

$$\log Q(s|z) = \log \frac{p(z|s=1)}{p(z|s=0)} + \log Q(s) \quad (6)$$

It can be seen from the formula (6) that only the first item of the probability value of the grid after state update is related to the measurement value, and the second item is the occupation probability value of the grid before state update. Similarity processing is performed for the above formula, the states of the grid before and after the update are denoted by $Q_{t-1}$ and $Q_t$ respectively, and the model measurement value is denoted by $\Delta q$ to obtain the following formula (7).

$$Q_t = \Delta q + Q_{t-1} \quad (7)$$

When the object semantic grid map is constructed by the above incremental estimation method, each grid of an initial blank map corresponds to an initial state value, $Q_0=0$. Different state update increments $\Delta q$ are set according to detection accuracy values of different types of objects, and a grid threshold $D_q$ is also set. It is proved that an object is present in this grid only when the grid state value is greater than $D_q$, and thus, the constructed map is updated to show that the grid is in the occupied state. While the state of the grid of object semantic mapping is updated, all grid points passed by a straight line connecting the semantic grid point to the grid point where the robot platform is located are obtained based on the Bresenham straight line segment scanning algorithm. State update is performed for these grid points, and all grids points are set to be in the idle state.

During map construction, when the sensor data is updated, that is, the pose of the robot platform is changed, the grid state is updated by the above method to avoid that the same frame of data is repeatedly taken as the measurement value for updating of the grid state. The incremental estimation method may effectively eliminate the "false semantics" caused by misdetection segmentation of some frames. For example, as shown in FIGS. 7A-7C, when the robot platform identifies an object around it, a wooden block is mistakenly segmented into a door in a particular frame; if semantic mapping is directly performed for the identified object, there will be incorrect semantic information in the obtained result, as shown in FIG. 7C. When the map is constructed by the incremental estimation method, the misdetections caused by mistakenly-identification of some frames will be eliminated, and the robot platform is operated to perform detection for the mistakenly-identified position several times, so as to eliminate the probability value of the grid at the mistakenly-identified position and obtain the accurate object semantics. An effect diagram obtained in the process is as shown in FIG. 8.

At step 5, after the robot platform traverses the environment, the object grid map and the environment grid map are obtained, and then merged to obtain a two-dimensional semantic grid map with wall corner information, which reflects semantic information of the environment.

After the grid points scanned in each frame of data and their states are known, the above data is repeatedly obtained according to the pose states of the mobile robot platform at different moments and the sensor information, and the state of each grid unit in the grid map coordinate system is updated according to the introduced Bayesian estimation principle. After the robot platform traverses the environment, whether there is a particular type of objects in the grid is determined according to whether the object probability value of each grid is greater than a set threshold, so as to complete construction of the indoor object semantic grid map. In FIGS. 9A-9C, FIG. 9A is the obtained laser environment grid map, FIG. 9B is the semantic mapping map of the object in the environment, and FIG. 9C is the semantic map of the detected wall corner in the environment.

Since the wall corner projection points in the initially-obtained wall corner semantic map are very in disorder, image morphology operation and connected-region analysis are performed for the map to remove these tiny isolated point regions, connect the isolated points close to the body part, extract the center of each part as the center of the corner point, and draw a solid circle of a certain size with the center of the corner point as center of circle to replace the corner point, so as to obtain the optimized wall corner semantic map as shown in FIG. 9B.

A synthetic semantic map as shown in FIG. 10B may be obtained by merging the laser map and the object semantic map. Specifically, the maps are merged in the following process: since the object grid map and the environment grid map are synchronously constructed, the two maps have the same grid resolution, and thus there will be same distance between the same objects in the two maps and their directions are also consistent; thus the merger can be easily completed only by aligning the poses of the two maps. Firstly, the position of the map center (origin of the map) is obtained by using a map file generated by the environment grid map constructed based on Gmapping; the generated object grid map is in a picture format, and its center is the center of the picture; thus, the centers of the two maps can be aligned by aligning the center of the environment grid map with the center of the object grid map with the direction unchanged. Next, the maps may be synthesized, which actually can be regarded as a picture operation. The non-black region (i.e., a target object) of the object grid map is traversed with OpenCV as a tool, and the color of the region is added into the corresponding position of the environment grid map. In this process, the centers and poses of the two maps are kept consistent; after all pixel values in the object grid map are traversed, addition of the color region in the environment grid map is also completed, so as to finally generate the environment grid map, which is the synthesized semantic grid map with wall corner information.

To express the high-level semantic information in the environment better, some optimizations are performed for the constructed semantic map, and different shapes of color blocks are used to replace different objects in a particular region in the environment, with a result as shown in FIG. 10C. The center position of each object in the synthesized semantic map is extracted, and the coordinate thereof in the map is stored in a corresponding description file together with the constructed semantic map, to facilitate subsequent query of the object position in the semantic map and complete higher-level positioning and navigation application tasks. It can be seen from the synthesized semantic map that the object basically overlaps with a corresponding obstacle in the grid map, and the position of the object is accurately expressed and can correctly reflect the environmental semantic information. Therefore, the construction of the two-dimensional semantic grid map is completed.

It will be obvious to those skilled in the art that changes and modifications may be made, and therefore, the aim in the appended claims is to cover all such changes and modifications.

What is claimed is:

1. A method of constructing an indoor wall corner two-dimensional semantic map based on a robot platform,
   the robot platform comprising a robot chassis, a master control computer, a lidar sensor, and a depth camera;
   the robot chassis being provided with the master control computer, the lidar sensor, and the depth camera;
   the master control computer being sequentially connected to the robot chassis, the lidar sensor, and the depth camera in a wired manner respectively;
   the method of constructing an indoor wall corner two-dimensional semantic map comprising:
   1) controlling, by the master control computer, the robot platform to move indoors, collecting, by the lidar sensor, a distance between an indoor object and the robot platform and a direction angle between the indoor object and the robot platform in real time and transmitting the distance and the direction angle to the master control computer, and obtaining, by the master control computer, an environment grid map and a real-time pose of the robot platform by processing the distance between the indoor object and the robot platform and the direction angle between the indoor object and the robot platform based on Gmapping algorithm;
   2) Constructing a semantic segmentation data set as a training set on the master control computer and obtaining a predicted non-wall corner semantic label by inputting each non-wall corner sample image in the semantic segmentation data set into a DeepLab v2 network for prediction, and further constructing a DeepLab v2 network loss function in combination with the non-wall corner semantic label to obtain an optimized DeepLab v2 network through optimization training; and constructing a wall corner target detection data set as a training set and obtaining a predicted rectangular bounding box and an object type in the predicted rectangular bounding box by inputting each wall corner sample image in the wall corner target detection data set into a single shot multibox detector (SSD) network for prediction, and further constructing an SSD network loss function in combination with the prediction box and the object type in the wall corner marking box to obtain the optimized SSD network through optimization training;
   3) Obtaining, by the master control computer, a view-angle color image of the robot platform by the depth camera, and inputting the view-angle color image into the optimized DeepLab v2 network for prediction to identify a semantic label of a non-wall corner in the view-angle color image; identifying the predicted rectangular bounding box of a wall corner and the object type in the predicted rectangular bounding box of the wall corner in the view-angle color image by passing the view-angle color image through the optimized SSD target detection network; and sequentially obtaining a three-dimensional point cloud coordinate of a non-wall corner and a three-dimensional point cloud coordinate of the wall corner by performing coordinate transformation for the semantic label of the non-wall corner in the view-angle color image, and the predicted rectangular bounding box of the wall corner and the object type in the predicted rectangular bounding box in the view-angle color image of the wall corner, and obtaining a filtered three-dimensional point cloud coordinate of the non-wall corner and a filtered three-dimensional point cloud coordinate of the wall corner by performing point cloud filtering for the three-dimensional point cloud coordinate of the non-wall corner and the three-dimensional point cloud coordinate of the wall corner respectively by using a filter based on a statistical method;
   4) Obtaining, by the master control computer, a coordinate of a non-wall corner object in an environment grid map coordinate system and a coordinate of a wall corner object in the environment grid map coordinate system by performing point cloud coordinate transformation for the filtered three-dimensional point cloud coordinate of the non-wall corner and the filtered three-dimensional point cloud coordinate of the wall corner in combination with the real-time pose of the robot platform, and constructing an object grid map based on the coordinate of the non-wall corner object in the environment grid map coordinate system and the coordinate of the wall corner object in the environment grid map coordinate system; and
   5) Obtaining a complete environment grid map and a complete object grid map by repeatedly performing 3-4) until the master control computer controls the robot platform to complete the traversal of the indoor environment, and further merging the complete environment grid map and the complete object grid map to obtain the indoor wall corner two-dimensional semantic map.

2. The method according to claim 1, wherein
in 1), the real-time pose of the robot platform is as follows:

$$c_{o,k} = (x_{o,k}, y_{o,k}, \theta_{o,k}), k \in [1, K]$$

where $c_{o,k}$ refers to the real-time pose of the robot platform at a k-th moment, $X_{o,k}$ refers to an x-axis coordinate of the robot platform in the environment grid map coordinate system at the k-th moment, $y_{o,k}$ refers to a y-axis coordinate of the robot platform in the environment grid map coordinate system at the k-th moment, $\theta_{o,k}$ refers to a yaw angle of the robot platform at the k-th moment, the yaw angle is an included angle with an x-axis positive direction, and K refers to the number of collection moments.

3. The method according to claim 1, wherein
in 2), the semantic segmentation data set is as follows:

$$I=\{data_m(u,v), type_m(u,v)\}, m \in [1,M], u \in [1,U_1], v \in [1,V_1]$$

where, M refers to a number of non-wall corner sample images in the semantic segmentation data set I, $U_I$ refers to a number of columns of each non-wall corner sample image in the semantic segmentation data set I, $V_I$ refers to a number of rows of each non-wall corner sample image in the semantic segmentation data set I, $data_m(u,v)$ refers to a pixel in column u and row v of the m-th non-wall corner sample image in the semantic segmentation data set I, and $type_m(u,v)$ refers to a category of the pixel in column u and row v of the m-th non-wall corner sample image in the semantic segmentation data set I;

in 2), the DeepLab v2 network loss function is a cross-entropy loss function;

in 2), the optimized DeepLab v2 network is obtained through optimization training, comprising:
minimizing the cross-entropy loss function as an optimized target, and
obtaining the optimized DeepLab v2 network through optimization based on a SGD(Stochastic Gradient Descent) algorithm;

in 2), the target detection data set is as follows:

$$C=\{data_p(x,y),(x_{p,n}^{l,u1},y_{p,n}^{l,u1},x_{p,n}^{r,d},y_{p,n}^{r,d},Ty_{p,n,s})\},$$

$$p \in [1,P], x \in [1,X], y \in [1,Y], n \in [1,N_p]$$

where, P refers to a number of wall corner sample images in the target detection data set, X refers to a number of columns of each wall corner sample image in the target detection data set, Y refers to a number of rows of each wall corner sample image in the target detection data set, $N_P$ refers to a number of rectangular bounding boxes in a p-th wall corner sample image in the target detection data set, and s refers to a category of a pixel point; $data_p(x,y)$ refers to a pixel in column x and row y in the p-th wall corner sample image in the target detection data set, $x_{p,n}^{l,u1}$ refers to an abscissa of an upper left corner of the n-th rectangular bounding box in the p-th wall corner sample image in the target detection data set, $y_{p,n}^{l,u1}$ refers to an ordinate of the upper left corner of the n-th rectangular bounding box in the p-th wall corner sample image in the target detection data set, $x_{p,n}^{r,d}$ refers to an abscissa of a lower right corner of the n-th rectangular bounding box in the p-th wall corner sample image in the target detection data set, $y_{p,n}^{r,d}$ refers to an ordinate of the lower right corner of the n-th rectangular bounding box in the p-th wall corner sample image in the target detection data set, and $Ty_{p,n,s}$ refers to an object type in the n-th rectangular bounding box in the p-th wall corner sample image in the target detection data set;

in 2), the SSD network loss function consists of a log loss function for classification and a smooth L1 loss function for regression;

in 2), the optimized SSD network is obtained through optimization training, comprising:
obtaining the optimized SSD network through optimization based on the SGD algorithm.

4. The method according to claim 1, wherein
in 3), the semantic label of the non-wall corner in the view-angle color image is as follows:

$$*w_k=\{*data(u,v)_k, *type_{s,k}\}$$

where, refers to information of the pixel in column u and row v in the view-angle color image at the k-th moment, and $*type_{s,k}$ refers to an object category of the pixel in column u and row v in the view-angle color image at the k-th moment;

in 3), the predicted rectangular bounding box of the wall corner and the object type in the predicted rectangular bounding box of the wall corner in the view-angle color image are as follows:

$$*e_k=\{data(x,y)_k,(x_n^l,y_n^l,x_n^h,y_n^h,Ty_s)_k\}$$

where, $*(x_n^1, y_n^1, x_n^h, Ty_s)_k$ refers to a position of the n-th predicted rectangular bounding box in column x and row y in the view-angle color image at the k-th moment and a wall corner category, and $data(x,y)_k$ refers to information of the a pixel in column x and row y in the view-angle color image at the k-th moment;

in 3), coordinate transformation is performed for the semantic label of the non-wall corner in the view-angle color image, and the predicted rectangular bounding box of the wall corner and the object type in the predicted rectangular bounding box in the view-angle color image of the wall corner as follows:

obtaining a pixel coordinate set of non-wall corner semantics in a pixel coordinate system of the view-angle color image in combination with $*w_k$ and $*e_k$ as follows:

$$W_k=\{((i_w,j_w),type(i_w,b,j_w))_b\}, b \in [1,B]$$

where, B refers to a total number of non-wall corner semantic pixel points in the current picture in the set; $(i_w,j_w)$ refers to a pixel point in row $i_w$ and column $j_w$ in the picture, and $((i_w,j_w),type(i_w,j_w))_b$ refers to that a pixel coordinate of the b-th semantic pixel point in the pixel coordinate set is $(i_w,j_w)$ and the pixel label is $type(i_w,j_w)$; and obtaining a pixel coordinate set of a wall corner semantics in the pixel coordinate system of the view-angle color image as follows:

$$E_k=\{((i_e,j_e),Ty(i_e,j_e))_t\}, t \in [1,T]$$

where, T refers to a total number of wall corner semantic pixel points in the current picture in the set; $(i_e,j_e)$ refers to the pixel point in row $i_e$ and column $j_e$ in the picture, and $((i_e,j_e),Ty(i_e,j_e))_t$ refers to that a pixel coordinate of the t-th semantic pixel point in the pixel coordinate set is $(i_e,j_e)$ and the pixel label is $Ty(i_e,j_e)$;

for the coordinate $(i_w,j_w)_b$ of the non-wall corner semantics in the current color image pixel coordinate system obtained above, the depth information is obtained by using the acquired depth map, and the camera calibration parameters are transformed into a camera coordinate system, so as to obtain the three-dimensional point cloud coordinate of the non-wall corner as follows:

$$\begin{cases} Z_w = d_w/1000 \\ X_w = (i_w - c_x) \cdot Z_w/f_x \\ Y_w = (j_w - c_y) \cdot Z_w/f_y \end{cases} ;$$

where, $(X_w, Y_w, Z_w)$ refer to the three-dimensional point cloud coordinates of the non-wall corner, the coordinate $(i_w, j_w)$ of each corresponding pixel point in the non-wall corner semantic pixel coordinate set refer to that the pixel point is located in row $i_w$ and column $j_w$ in the current color picture, and $d_w$ refers to a depth value of the pixel coordinate $(i_w, j_w)$ in the depth image; $c_x$, $c_y$, $f_x$ and $f_y$ are camera calibration internal parameters, where $c_x$ and $c_y$ refer to transverse and vertical pixel numbers of a difference between a center pixel coordinate of the image and an origin pixel coordinate of the image respectively, $(c_x, c_y)$ is an optical center, and $f_x$ and $f_y$ refer to transverse and vertical distances from a focal point of a camera to the optical center of the camera respectively;

for the coordinate $(i_e, j_e)_t$ of the wall corner semantics in the current color image pixel coordinate system obtained above, the depth information is obtained by using the acquired depth map, and the camera calibration parameters are transformed into the camera coordinate system, so as to obtain the three-dimensional point cloud coordinate of the wall corner;

the point cloud coordinate $(X_e, Y_e, Z_e)$ of the wall corner semantics in the camera coordinate system is obtained as follows:

$$\begin{cases} Z_e = d_e/1000 \\ X_e = (i_e - c_x) \cdot Z_e/f_x \\ Y_e = (j_e - c_y) \cdot Z_e/f_y \end{cases} ;$$

where, $(X_e, Y_e, Z_e)$ refers to a three-dimensional point cloud coordinate of the wall corner obtained through transformation, the coordinate $(i_e, j_e)$ of each corresponding pixel point in the wall corner semantic pixel coordinate set refers to that the pixel point is located in the row $i_e$ and column $j_e$ in the current color picture, and $d_e$ refers to a depth value of the pixel coordinate $(i_e, j_e)$ in the depth image; $c_x$, $c_y$, $f_x$ and $f_y$ are camera calibration internal parameters, $c_x$ and $c_y$ refer to transverse and vertical pixel numbers of a difference between a center pixel coordinate of the image and an origin pixel coordinate of the image respectively, $(c_x, c_y)$ is the optical center, and $f_x$ and $f_y$ refer to transverse and vertical distances from the focal point of the camera to the optical center of the camera respectively;

in 3), point cloud filtering is performed for the three-dimensional point cloud coordinate $(X_w, Y_w, Z_w)$ of the non-wall corner and the three-dimensional point cloud coordinate $(X_e, Y_e, Z_e)$ of the wall corner respectively by using the filter based on the statistical method as follows:

after discrete point clouds are removed from point cloud data by using the filter based on the statistical method, extracting a cluster of point clouds closest to the robot platform from the object point clouds which is equivalent to extracting outer contour point clouds of the object at a view angle, so as to obtain the filtered non-wall corner semantic point cloud coordinate $(X'_w, Y'_w, Z'_w)$ and the filtered wall corner semantic point cloud coordinate $(X'_e, Y'_e, Z'_e)$.

5. The method according to claim 1, wherein
in 4), the point cloud coordinate transformation is described as follows:
transforming the obtained the point cloud coordinate $(X'_w, Y'_w, Z'_w)$ of the non-wall corner semantics in the camera coordinate system into a robot platform coordinate system $(X_{robot,w}, Y_{robot,w}, Z_{robot,w})$ in the following relationship:

$$\begin{bmatrix} X_{robot,w} \\ Y_{robot,w} \\ Z_{robot,w} \\ 1 \end{bmatrix} = \begin{bmatrix} R_1 & T_1 \\ 0^T & 1 \end{bmatrix} \begin{bmatrix} X'_w \\ Y'_w \\ Z'_w \\ 1 \end{bmatrix} ;$$

and transforming the obtained point cloud coordinate $(X'_e, Y'_e, Z'_e)$ of the wall corner semantics in the camera coordinate system into a robot platform coordinate system $(X_{robot,e}, Y_{robot,e}, Z_{robot,e})$ in the following relationship:

$$\begin{bmatrix} X_{robot,e} \\ Y_{robot,e} \\ Z_{robot,e} \\ 1 \end{bmatrix} = \begin{bmatrix} R_1 & T_1 \\ 0^T & 1 \end{bmatrix} \begin{bmatrix} X'_e \\ Y'_e \\ Z'_e \\ 1 \end{bmatrix} ;$$

in the above formula, $R_1$ and $T_1$ refer to a 3*3 rotation matrix and a 3*1 translation matrix between a Kinect v2 depth camera coordinate system and a mobile robot platform coordinate system respectively, which are determined based on a mounting position relationship of the depth camera on the robot platform, that is, $0^T = (0,0,0)$;

the non-wall corner semantic point cloud coordinate $(X_{robot,w}, Y_{robot,w}, Z_{robot,w})$ and the wall corner semantic point cloud coordinate $(X_{robot,e}, Y_{robot,e}, Z_{robot,e})$ in the robot platform coordinate system as well as the wall corner and non-wall corner semantic point cloud coordinate set $R = \{(X_{R,f}, Y_{R,f}, Z_{R,f})\}$ are all obtained through the above transformation, where a subscript f refers to the f-th semantic point in the set; for convenience of expression, the following semantic point cloud coordinates in the robot platform coordinate system are uniformly expressed by $(X_R, Y_R, Z_R)$;

then, the coordinate $(X_{Wo}, Y_{Wo}, Z_{Wo})$ in a world coordinate system is obtained by transforming the coordinate $(X_R, Y_R, Z_R)$ in the robot platform coordinate system in combination with the real-time pose $(x_{o,k}, y_{o,k}, \theta_{o,k})$ of the robot platform obtained based on the Gmapping map construction algorithm as follows:

a transformation relationship between the mobile robot platform coordinate system and the world coordinate system is:

$$\begin{bmatrix} X_{Wo} \\ Y_{Wo} \\ Z_{Wo} \\ 1 \end{bmatrix} = \begin{bmatrix} R_2 & T_2 \\ 0^T & 1 \end{bmatrix} \begin{bmatrix} X_R \\ Y_R \\ Z_R \\ 1 \end{bmatrix} ;$$

in the above formulas, $R_2$ and $T_2$ refer to a 3*3 rotation matrix and a 3*1 translation matrix between the mobile robot platform coordinate system and the real world coordinate system respectively, and $0^T$ is $(0,0,0)$;

$$R_2 = \begin{bmatrix} \cos\theta_{o,k} & -\sin\theta_{o,k} & 0 \\ \sin\theta_{o,k} & \cos\theta_{o,k} & 0 \\ 0 & 0 & 1 \end{bmatrix}$$

$$T_2 = \begin{bmatrix} x_{o,k} \\ y_{o,k} \\ \theta_{o,k} \end{bmatrix};$$

finally, the coordinate $(X_g, Y_g)$ in an object grid map coordinate system is obtained by transforming the coordinate $(X_{Wo}, Y_{Wo})$ in the real world coordinate system:

$$\begin{cases} X_g = \text{ceil}\left(\dfrac{X_{Wo}}{r}\right) \\ Y_g = \text{ceil}\left(\dfrac{Y_{Wo}}{r}\right) \end{cases};$$

in the above formula, $(X_{Wo}, Y_{Wo})$ refer to a coordinate of a semantic point in the world coordinate system, $(X_g, Y_g)$ refer to a coordinate of the point in the object grid map coordinate system, r refers to a unit resolution of the object grid map, and cell refers to a symbol of rounding up;

the coordinate value $((X_g, Y_g))$ of each semantic point in the object grid map coordinate system is obtained through a series of coordinate transformations described above, and each finally-obtained semantic point is marked on the constructed object grid color map; different object types $g_s$ are marked by different $color_s$.

6. The method according to claim 1, wherein in 5), the complete environment grid map and the complete object grid map are merged as follows:

a center of the complete environment grid map is acquired and aligned with a center of the complete object grid map to traverse the coordinate of the non-wall corner object in the environment grid map coordinate system and the coordinate of the wall corner object in the environment grid map coordinate system and add the corresponding mark at this position to the corresponding position of the environment grid map, and the center of the complete environment grid map is consistent with the center and pose of the complete object grid map, so as to finally obtain the indoor wall corner two-dimensional semantic map.

* * * * *